United States Patent
Lee et al.

(10) Patent No.: US 10,408,989 B2
(45) Date of Patent: Sep. 10, 2019

(54) OPTICAL FILM FOR IMPROVING CONTRAST RATIO, POLARIZING PLATE INCLUDING SAME, AND LIQUID CRYSTAL DISPLAY DEVICE INCLUDING SAME

(71) Applicant: SAMSUNG SDI CO., LTD., Yongin-si, Gyeonggi-do (KR)

(72) Inventors: Jeong Ho Lee, Suwon-si (KR); Young Oh, Suwon-si (KR); Seong Hoon Lee, Suwon-si (KR); Young Hyun Ju, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/559,808

(22) PCT Filed: Apr. 28, 2016

(86) PCT No.: PCT/KR2016/004465
§ 371 (c)(1),
(2) Date: Sep. 19, 2017

(87) PCT Pub. No.: WO2016/175580
PCT Pub. Date: Nov. 3, 2016

(65) Prior Publication Data
US 2018/0045876 A1    Feb. 15, 2018

(30) Foreign Application Priority Data

Apr. 29, 2015 (KR) .................. 10-2015-0060935
Apr. 27, 2016 (KR) .................. 10-2016-0051816

(51) Int. Cl.
*G02F 1/1335*    (2006.01)
*F21V 8/00*    (2006.01)

(52) U.S. Cl.
CPC ..... *G02B 6/0053* (2013.01); *G02F 1/133528* (2013.01)

(58) Field of Classification Search
CPC .......... G02F 1/13528; G02F 1/133504; G02F 2001/133504; G02B 6/0053
See application file for complete search history.

(56) References Cited

U.S. PATENT DOCUMENTS

| | | | |
|---|---|---|---|
| 2012/0176572 A1* | 7/2012 | Park | G02B 3/005 349/112 |
| 2014/0184994 A1* | 7/2014 | Kuroda | B32B 7/02 349/96 |
| 2015/0109561 A1* | 4/2015 | Fuchida | G02B 1/105 349/96 |

FOREIGN PATENT DOCUMENTS

| | | |
|---|---|---|
| JP | 2006-251659 | 9/2006 |
| KR | 10-0809037 | 3/2008 |

(Continued)

OTHER PUBLICATIONS

International Search Report, corresponding to PCT/KR2016/004465, dated Jul. 26, 2016, 3 pages.

*Primary Examiner* — Thanh Nhan P Nguyen
(74) *Attorney, Agent, or Firm* — Lewis Roca Rothgerber Christie LLP

(57) ABSTRACT

An optical film for improving contrast ratio, a polarizing plate including the same, and a liquid crystal display including the same are disclosed. The optical film for improving contrast ratio includes: a base layer and a contrast ratio improvement layer formed on the base layer, wherein the contrast ratio improvement layer includes a high refractive index resin layer including a patterned portion composed of one or more engraved patterns and a flat portion formed between the engraved patterns and a low refractive index resin layer directly formed on the patterned portion, the (Continued)

engraved patterns have a base angle of 75° to about 90°, and the patterned portion has a P/W value of greater than about 1 to about 10 or less (P is the cycle of the patterned portion (unit: μm) and W is the maximum width of the engraved pattern (unit: μm)).

19 Claims, 6 Drawing Sheets

(56) References Cited

FOREIGN PATENT DOCUMENTS

| KR | 10-0870290 | 11/2008 |
| KR | 10-0938682 | 1/2010 |
| KR | 10-2012-0026600 | 3/2012 |
| KR | 10-1390520 | 4/2014 |

* cited by examiner

[Figure 1]
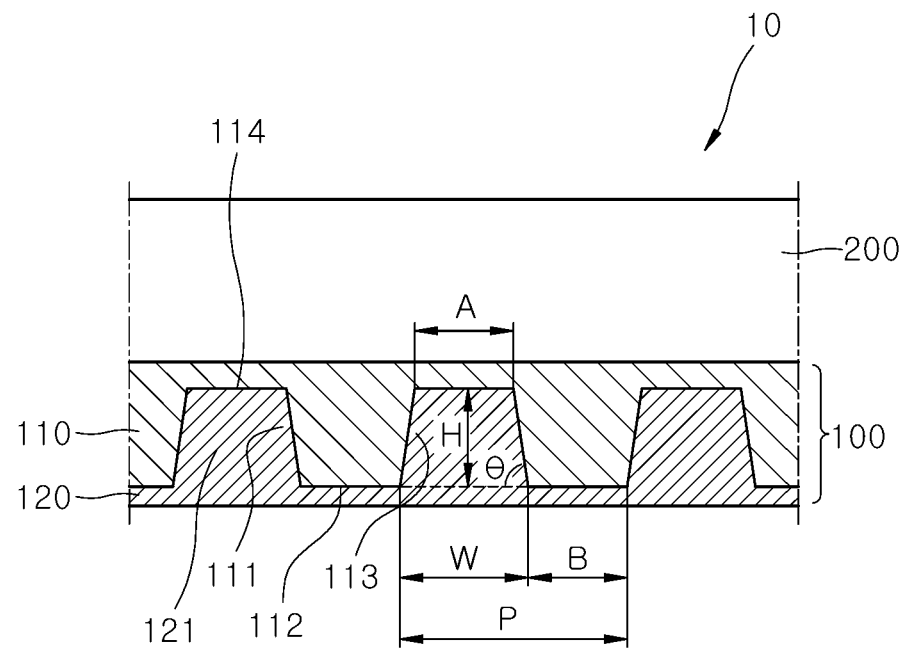
[Figure 2]
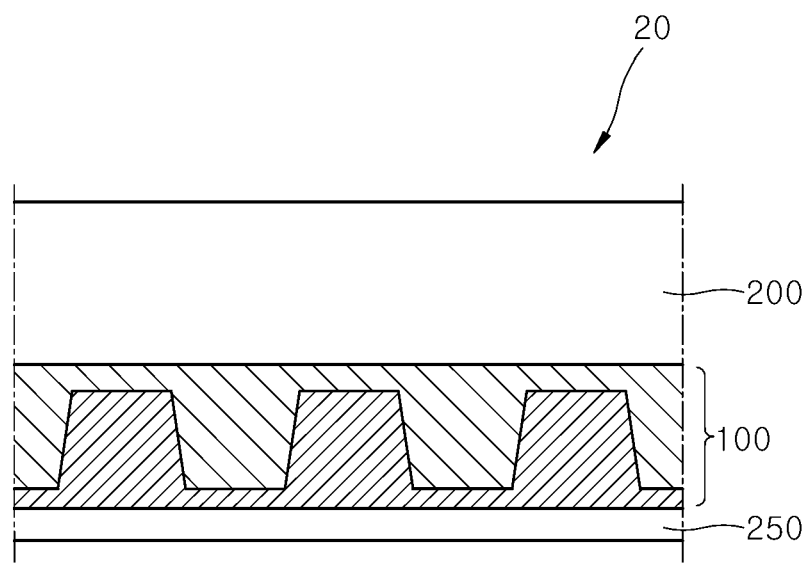

[Figure 3]
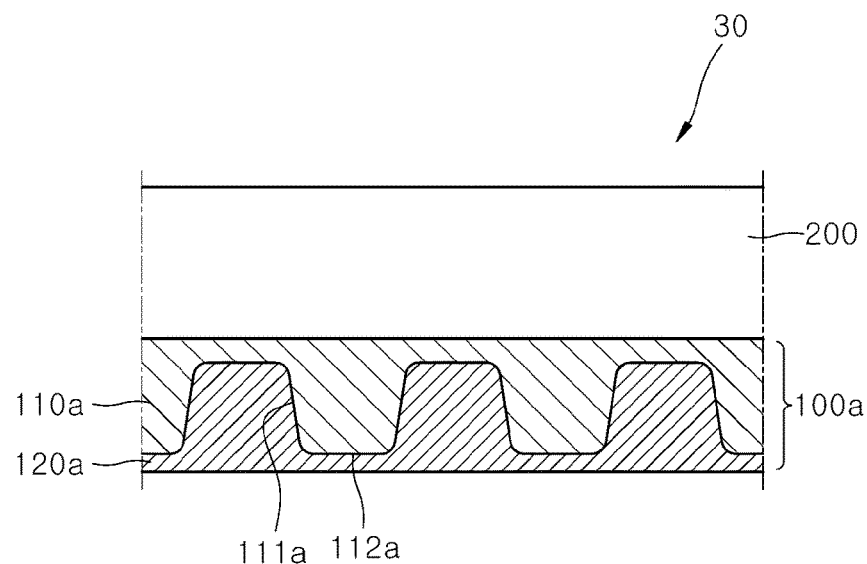
[Figure 4]
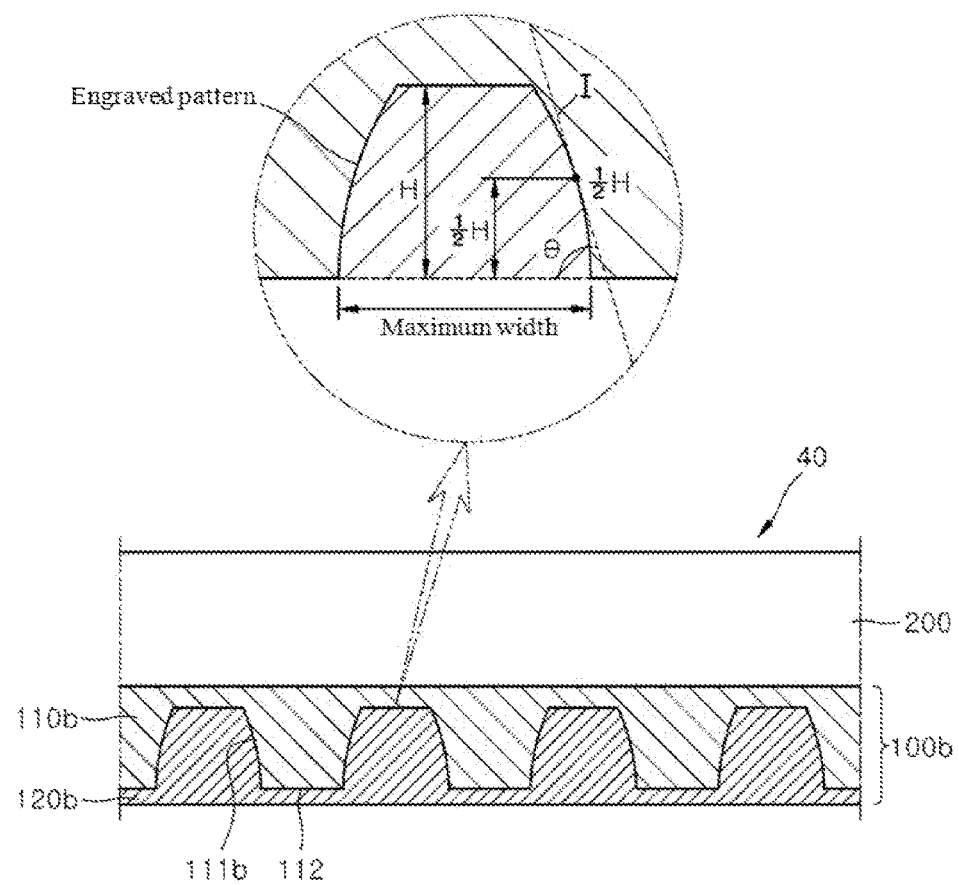

[Figure 5]
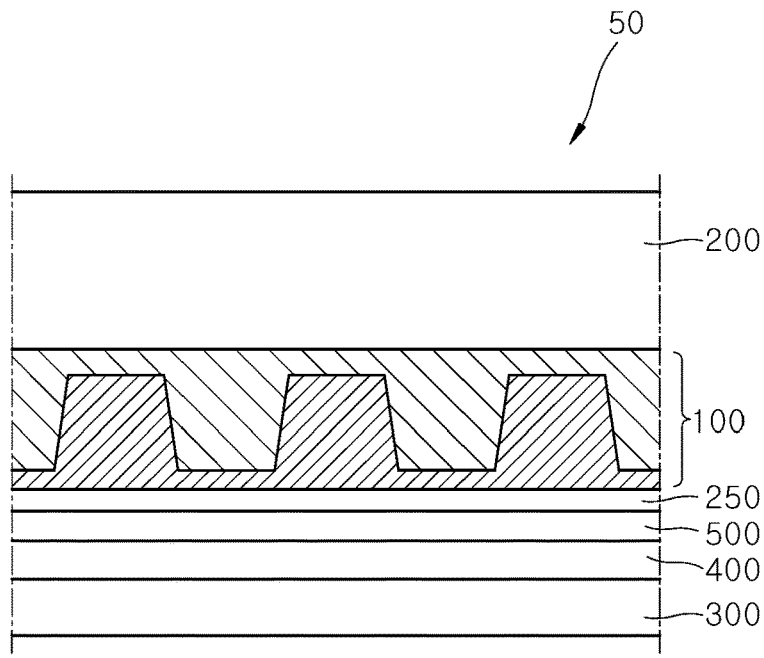
[Figure 6]
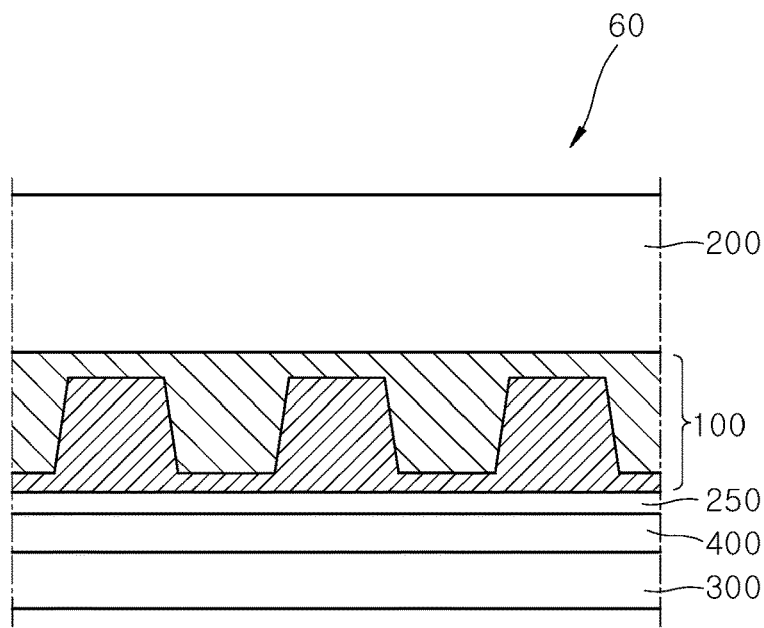

【Figure 7】
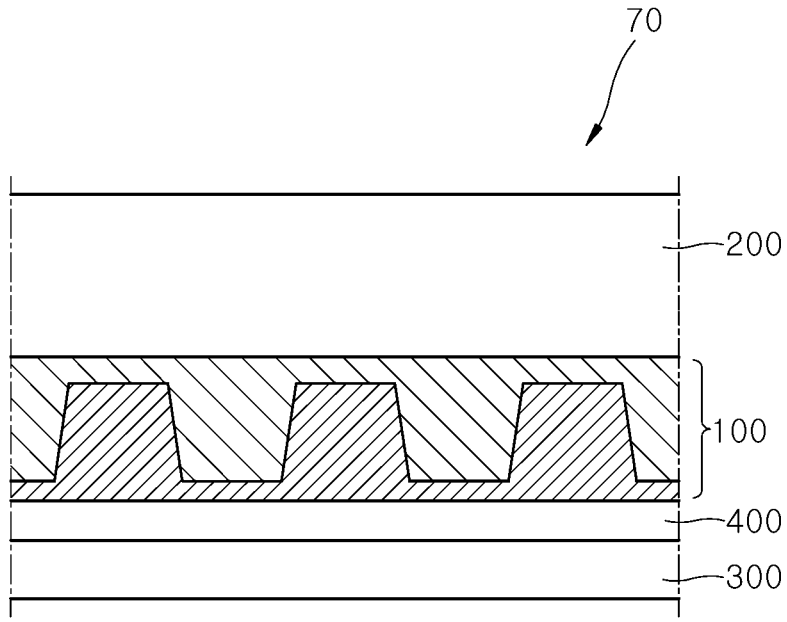
【Figure 8】
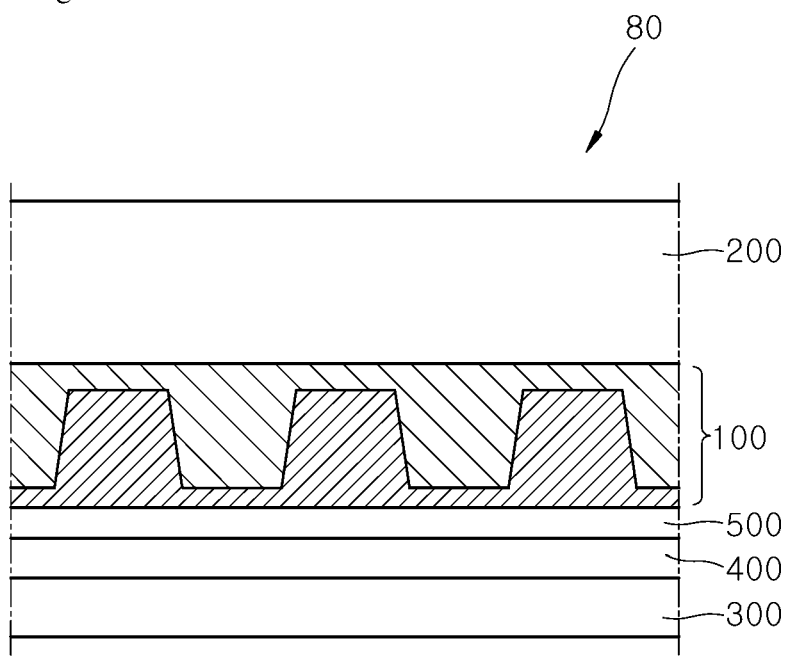

【Figure 9】
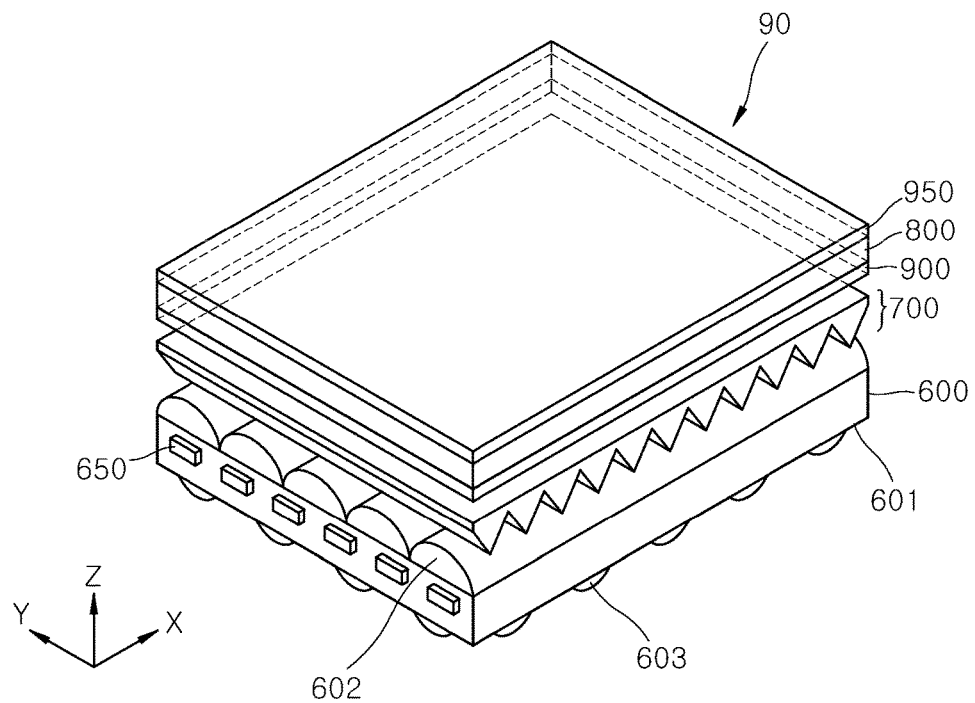
【Figure 10】
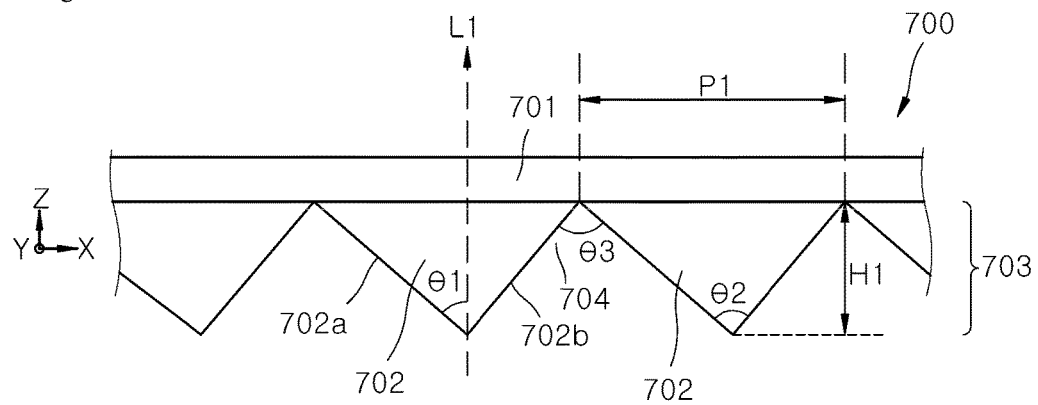

[Figure 11]
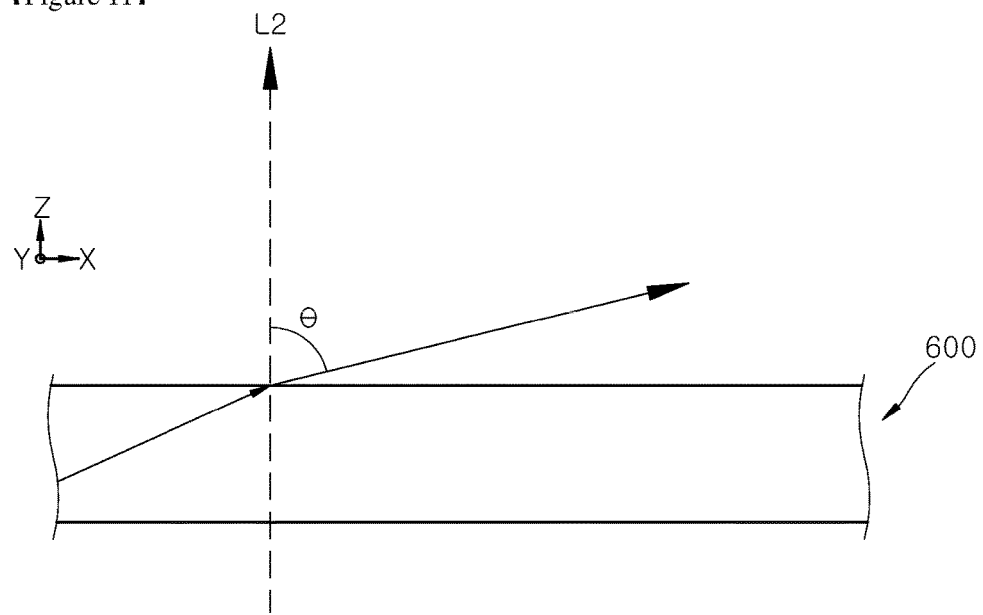

OPTICAL FILM FOR IMPROVING CONTRAST RATIO, POLARIZING PLATE INCLUDING SAME, AND LIQUID CRYSTAL DISPLAY DEVICE INCLUDING SAME

CROSS-REFERENCE TO RELATED APPLICATIONS

This Application is a National Phase Patent Application and claims priority to and the benefit of International Application Number PCT/KR2016/004465, filed on Apr. 28, 2016, which claims priority to Korean Application No. 10-2016-0051816, filed on Apr. 27, 2016, and Korean Application No. 10-2015-0060935, filed on Apr. 29, 2015, the entire contents of all of which are incorporated herein by reference.

BACKGROUND

1. Field

The present invention relates to an optical film for improving contrast ratio, a polarizing plate including the same, and a liquid crystal display including the same.

2. Description of the Related Art

A liquid crystal display is operated to emit light through a liquid crystal panel after receiving the light from a backlight unit. Thus, the liquid crystal display provides a good front contrast ratio (CR). However, the liquid crystal display has a lower contrast ratio at side or lateral sides thereof than at front side. Various attempts have been made in order to increase side contrast ratio by modification of a liquid crystal panel or a liquid crystal structure. Higher side contrast ratio causes deterioration in front contrast ratio. Accordingly, there is a need for minimization of decrease of the front contrast ratio while increasing the side contrast ratio in order to improve visibility.

Decrease in side contrast ratio can be prevented by diffusing collected light having passed through a liquid crystal panel and a polarizing plate. Diffusion of the collected light can be achieved through an optical film including beads. However, such an optical film can provide low diffusion efficiency or can be difficult to produce.

Recently, an inverted prism sheet including prisms formed on a light incidence plane thereof is applied to a liquid crystal display. The inverted prism sheet can provide higher brightness than a typical prism sheet including prisms formed on a light exit plane. However, a liquid crystal display including such an inverted prism sheet is also required to increase relative brightness and contrast ratio in order to improve image quality. Particularly, an optical film for improving contrast ratio or a polarizing plate, which are capable of improving both relative brightness and contrast ratio for both the liquid crystal display including the inverted prism sheet having prisms formed on the light incidence plane thereof and the liquid crystal display including the prism sheet having prisms formed on the light exit plane thereof can be very useful.

One example of the background technique is disclosed in Japanese Patent Laid-open Publication No. 2006-251659.

SUMMARY

It is one aspect of the present invention to provide an optical film for improving contrast ratio, which can increase relative brightness, improve front contrast ratio and side contrast ratio, and minimize a decrease of the front contrast ratio while increasing the side contrast ratio.

It is another aspect of the present invention to provide an optical film for improving contrast ratio, which can reduce a difference between the front contrast ratio and the side contrast ratio.

It is other aspect of the present invention to provide an optical film for improving contrast ratio, which can increase contrast ratio at the same side viewing angle and at the same front viewing angle.

It is other aspect of the present invention to provide an optical film for improving contrast ratio, which can improve image quality.

It is other aspect of the present invention to provide an optical film for improving contrast ratio, which can improve both relative brightness and contrast ratio in each of a liquid crystal display including a prism sheet having prisms formed on a light incidence plane thereof and a liquid crystal display including a prism sheet having prisms formed on a light exit plane thereof.

It is other aspect of the present invention to provide an, which can a liquid crystal display, which includes a prism sheet having prisms formed on a light incidence plane thereof and has improved properties in terms of front contrast ratio, side contrast ratio, side viewing angle, and brightness.

In accordance with one aspect of the present invention, an optical film for improving contrast ratio may include: a base layer and a contrast ratio improvement layer formed on the base layer, wherein the contrast ratio improvement layer includes a high refractive index resin layer including a patterned portion composed of one or more engraved patterns and a flat portion formed between the engraved patterns and a low refractive index resin layer directly formed on the patterned portion, the engraved patterns have a base angle of 75° to about 90°, and the patterned portion has a P/W value of greater than about 1 to about 10 or less (P is the cycle of the patterned portion (unit: μm) and W is the maximum width of the engraved pattern (unit: μm)).

In accordance with another aspect of the present invention, a polarizing plate may include the optical film for improving contrast ratio as set forth in the present invention.

In accordance with a further aspect of the present invention, a liquid crystal display may include the optical film for improving contrast ratio as set forth in the present invention.

In accordance with yet another aspect of the present invention, a liquid crystal display may include a light guide plate; a prism sheet; a first polarizing plate; a liquid crystal panel; and a second polarizing plate sequentially stacked one above another, wherein the prism sheet includes one or more prisms formed on a surface thereof facing the light guide plate and the second polarizing plate includes the optical film for improving contrast ratio as set forth in the present invention.

The present invention provide an optical film for improving contrast ratio, which can improve relative brightness, front contrast ratio and side contrast ratio while minimizing decrease in front contrast ratio.

The present invention provide an optical film for improving contrast ratio, which can reduce a difference between the front contrast ratio and the side contrast ratio.

The present invention provide an optical film for improving contrast ratio, which can increase contrast ratio at the same side viewing angle and the same front viewing angle.

The present invention could provide an optical film for improving contrast ratio, which can improve image quality.

The present invention could provide an optical film for improving contrast ratio, which can improve both relative brightness and contrast ratio in each of a liquid crystal display including a prism sheet having prisms formed on a light incidence plane thereof and a liquid crystal display including a prism sheet having prisms formed on a light exit plane thereof.

The present invention could provide a liquid crystal display, which includes a prism sheet having prisms formed on a light incidence plane thereof and has improved properties in terms of front contrast ratio, side contrast ratio, side viewing angle, and brightness.

BRIEF DESCRIPTION OF THE DRAWINGS

FIG. 1 is a cross-sectional view of an optical film for improving contrast ratio according to one embodiment of the present invention.

FIG. 2 is a cross-sectional view of an optical film for improving contrast ratio according to another embodiment of the present invention.

FIG. 3 is a cross-sectional view of an optical film for improving contrast ratio according to a further embodiment of the present invention.

FIG. 4 is a cross-sectional view of an optical film for improving contrast ratio according to yet another embodiment of the present invention.

FIG. 5 is a cross-sectional view of a polarizing plate according to one embodiment of the present invention.

FIG. 6 is a cross-sectional view of a polarizing plate according to another embodiment of the present invention.

FIG. 7 is a cross-sectional view of a polarizing plate according to a further embodiment of the present invention.

FIG. 8 is a cross-sectional view of a polarizing plate according to yet another embodiment of the present invention.

FIG. 9 is a schematic perspective view of a liquid crystal display according to one embodiment of the present invention.

FIG. 10 is a cross-sectional view of a prism sheet of the liquid crystal display shown in FIG. 9.

FIG. 11 is a conceptual view of a light exit angle of the light guide plate.

DETAILED DESCRIPTION

Embodiments of the present invention will be described in detail with reference to the accompanying drawings to provide a thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification.

As used herein, spatially relative terms such as "upper" and "lower" are defined with reference to the accompanying drawings. Thus, it will be understood that "upper" can be used interchangeably with "lower", "lower" can be used interchangeably with "upper". It will be understood that when a layer is referred to as being "on" another layer, it can be directly formed on the other layer, or intervening layer(s) may also be present. Thus, it will be understood that when a layer is referred to as being "directly on" another layer, no intervening layer is interposed therebetween.

As used herein, the terms "horizontal direction" and "vertical direction" mean a longitudinal direction and a transverse direction of a rectangular screen of a liquid crystal display, respectively. As used herein, the term "side surface" means a region in which θ ranges from 60° to 90° in which a front side is indicated by (0°, 0°), a left end point is indicated by (180°, 90°), and a right end point is indicated by (0°, 90°) in a spherical coordinate system (Φ, θ) with reference to the horizontal direction.

As used herein, the term "top part" refers to a portion located at an uppermost portion of an optical structure.

As used herein, the term "aspect ratio" refers to a ratio of maximum height of an optical structure to maximum width thereof (maximum height/maximum width).

As used herein, the term "cycle" means the distance between adjacent engraved patterns, for example, the sum of a width of one engraved pattern and a width of one flat portion.

As used herein, "in-plane retardation (Re)" is represented by Equation A:

$$Re=(nx-ny)\times d \qquad \text{<Equation A>}$$

(In Equation A, wherein nx and ny are refractive indexes at a wavelength of 550 nm in the slow axis direction and the fast axis direction of a corresponding optical element, respectively, and d is the thickness of the corresponding optical element (unit: nm)).

As used herein, the term "(meth)acryl" refers to acryl and/or methacryl.

As used herein, the term "radius of curvature" means, in the case of an optical pattern having a curved surface at a top part thereof, a radius of an imaginary circle including the curved surface or, in the case of a prism pattern, a radius of an imaginary circle including a curved surface tangential to both one inclined plane of the prism and the other inclined plane of the prism meeting the one inclined plane.

Hereinafter, an optical film for improving contrast ratio according to one embodiment of the present invention will be described with reference to FIG. 1. FIG. 1 is a cross-sectional view of an optical film for improving contrast ratio according to one embodiment of the present invention.

Referring to FIG. 1, an optical film 10 for improving contrast ratio according to one embodiment may include a contrast ratio improvement layer 100 and a base layer 200.

The contrast ratio improvement layer 100 includes a high refractive index resin layer 110, which includes a patterned portion composed of one or more engraved patterns 111 and a flat potrion 112 formed between the engraved patterns 111, and a low refractive index resin layer 120 directly formed on the high refractive index resin layer 110. Herein, the expression "directly formed on" means that any intervening layers such as an adhesive layer, a bonding layer and/or other optical layers are not formed between the high refractive index resin layer 110 and the low refractive index resin layer 120. As such, the contrast ratio improvement layer 100 is a film in which the high refractive index resin layer 110 adjoins the low refractive index resin layer 120 without the adhesive layer or the bonding layer interposed therebetween. According to this embodiment, the optical film including the contrast ratio improvement layer 100 can simultaneously improve relative brightness at a front side, can improve both front contrast ratio and side contrast ratio by minimizing reduction in the front contrast ratio while increasing the side contrast ratio, can reduce a difference between the front contrast ratio and the side contrast ratio, and can increase contrast ratio at the same side viewing angle and at the same front viewing angle, when mounted on a prism sheet having prisms formed on a light exit plane thereof in the liquid crystal display. Particularly, according to this embodiment, the optical film including the contrast ratio improvement layer 100 can improve relative brightness at the front side of the liquid crystal display and can improve the front contrast ratio, when mounted on an inverted prism sheet having prisms formed on a light incidence plane thereof in the liquid crystal display, as in the case of being mounted on the prism sheet having prisms formed on the light exit plane thereof. The contrast ratio improvement layer 100 may have a thickness of about 10 μm to about 100 μm, specifically about 20 μm to about 60 μm, more specifically about 20 μm to about 45 μm. Within this thickness range, the contrast ratio improvement layer 100 can be sufficiently supported by the base layer and can be used in an optical display.

The high refractive index resin layer 110 may be formed on the base layer 200 so as to increase light diffusing effects by diffusing light reaching the low refractive index resin layer 120 in the optical display. The high refractive index resin layer 110 is directly formed on the base layer 200. Herein, the expression "directly formed on" means that intervening layers such as an adhesive layer, a bonding layer and/or other optical layers are not formed between the high refractive index resin layer 110 and the base layer 200. FIG. 1 shows the structure wherein the low refractive index resin layer 120, the high refractive index resin layer 110 and the base layer 200 are sequentially stacked one above another. Alternatively, the base layer 200, the low refractive index resin layer 120, and the high refractive index resin layer 110 may be sequentially stacked one above another such that the base layer 200 directly adjoins the low refractive index resin layer 120 and light is transmitted through the low refractive index resin layer and the high refractive index resin layer after passing through the base layer so as to provide advantageous effects of the present invention.

The high refractive index resin layer 110 has a higher refractive index than the low refractive index resin layer 120. Specifically, a difference in refractive index between the high refractive index resin layer 110 and the low refractive index resin layer 120 may be about 0.20 or less, specifically about 0.10 to about 0.20, more specifically about 0.10 to about 0.15. Within this range of difference in refractive index, the optical film can achieve significant improvement in diffusion of light and contrast ratio. Particularly, with a difference in refractive index in the range of about 0.10 to about 0.15, the optical film can provide good effects in diffusion of polarized light in the optical display, thereby improving brightness at the same viewing angle. The high refractive index resin layer 110 may have a refractive index of about 1.50 or more, specifically about 1.50 to about 1.70. Within this range of refractive index, the optical film can provide good light diffusing effects. The high refractive index resin layer 110 may be formed of a UV-curable composition or a thermosetting composition including at least one of a (meth)acrylic resin, a polycarbonate resin, a silicone resin, and an epoxy resin, without being limited thereto.

The high refractive index resin layer 110 includes the patterned portion composed of one or more engraved patterns 111 and a flat portion 112 formed between the engraved patterns 111. The patterned portion may have a P/W value of greater than about 1 to about 10 or less (P is the cycle of the patterned portion (unit: μm) and W is the maximum width of the engraved pattern (unit: μm)) and the engraved patterns 111 may have a base angle (θ) of 75° to about 90°. The base angle (θ) means an angle between an inclined plane 113 of the engraved patterns 111 and an imaginary line extending from the maximum width W of the engraved patterns 111 and may be in the range of 75° to about 90°. Within these ranges of P/W value and base angle, the optical film can improve relative brightness at the front side, can simultaneously improve both the front contrast ratio and the side contrast ratio, can reduce a difference between the front contrast ratio and the side contrast ratio, and can increase contrast ratio at the same side viewing angle and at the same front viewing angle, when mounted on the prism sheet having prisms formed on the light exit plane thereof in the liquid crystal display. In addition, the optical film can improve relative brightness at the front side and can improve the front contrast ratio, when mounted on the inverted prism sheet having prisms formed on the light incidence plane thereof in the liquid crystal display, as in the case of being mounted on the prism sheet having prisms formed on the light exit plane thereof. Specifically, the base angle (θ) may range from about 80° to about 90° and the P/W value may range from about 1.2 to about 8, more specifically from about 1.3 to about 7.5.

Although FIG. 1 shows the structure wherein the engraved pattern has the same base angle at both sides thereof, the engraved pattern according to the present invention may have different base angles so long as the base angle ranges from 75° to about 90°.

The flat portion 112 can diffuse light and maintain the front contrast ratio and brightness by allowing the light reaching the flat portion 112 to exit the optical film therethrough. A ratio (W/B) of the maximum width W of the engraved pattern 111 to the width B of the flat portion 112 may be about 9 or less, specifically about 0.1 to about 5, more specifically about 0.15 to about 3. Within this range, the optical film can improve relative brightness at the front side of the liquid crystal display, can reduce the difference between the front contrast ratio and the side contrast ratio, and can increase contrast ratio at the same side viewing angle and the same front viewing angle. Furthermore, the optical film can prevent the Moiré phenomenon. The flat portion 112 may have a width of about 1 μm to about 300 μm, specifically about 3 μm to about 50 μm. Within this width range, the optical film including the flat portion can improve front brightness.

The engraved pattern 111 may be an engraved optical pattern composed of a first surface 114 formed at a top part thereof and one or more inclined planes 113 connected to the first face 114. The first surface 114 is formed at the top part of the engraved pattern 111 so as to allow light reaching the low refractive index resin layer 120 in the optical display to be further diffused by the first surface 114, thereby improving viewing angle and brightness. Accordingly, the optical film according to this embodiment can minimize brightness loss through improvement in light diffusing effect. Although FIG. 1 shows the structure wherein the first surface 114 is a flat surface and is parallel to the flat portion 112, the first surface 114 may have fine roughness or a curved surface. In the structure wherein the first surface has a curved surface, the engraved pattern 111 may be realized as a lenticular lens pattern. The first surface 114 may have a width A of about 0.5 μm to about 30 μm, specifically about 2 μm to about 20 μm. Referring to FIG. 1, the engraved pattern 111 may have a trapezoidal cross-sectional shape in which the first surface is formed at the top part thereof and the inclined planes are flat surfaces (for example: a truncated prism pattern having a truncated triangular cross-section, that is, a truncated prism or cut-prism shape). Alternatively, the engraved pattern may have a shape in which the first surface is formed at the top part and the inclined plane is a curved surface (for example: a truncated lenticular lens such as cut-lenticular lens pattern, or a truncated micro-lens such as cut-micro lens pattern).

The engraved patterns 111 may have an aspect ratio of about 0.3 to about 3.0, specifically about 0.4 to about 2.5, more specifically about 0.4 to about 1.5. Within this range of aspect ratio, the optical film can improve the side contrast ratio and viewing angle of the optical display. The engraved patterns 111 may have a height H of about 40 μm or less, specifically about 30 μm or less, more specifically about 5 μm to about 15 μm. Within this height range, the engraved pattern can improve contrast ratio, viewing angle, and brightness without causing the Moiré phenomenon. The engraved pattern 111 may have a maximum width W of about 80 μm or less, specifically about 50 μm or less, more specifically about 5 μm to about 20 μm or about 10 μm to about 30 μm. Within this width range, the engraved pattern can improve contrast ratio, viewing angle, and brightness without causing the Moiré phenomenon.

The patterned portion may have a cycle P of about 5 μm to about 500 μm, specifically about 10 μm to about 50 μm. Within this cyclerange, the patterned portion can improve brightness and contrast ratio without causing the Moiré phenomenon.

The low refractive index resin layer 120 can diffuse light by refracting the light incidented through a lower surface of the optical display in various directions depending upon incident positions of the light. The low refractive index resin layer 120 may directly adjoin the high refractive index resin layer 110. The low refractive index resin layer 120 may include a plane facing the high refractive index resin layer 110 and one or more filling patterns 121. The filling patterns 121 may at least partially fill the engraved patterns 111. Herein, the expression "at least partially fill" includes both a structure wherein the engraved pattern is completely filled with the filling pattern and a structure wherein the engraved pattern is partially filled therewith. In the structure wherein the engraved pattern is partially filled with the filling pattern, a remaining portion of the engraved pattern may be filled with air or a resin having a predetermined refractive index. Specifically, the resin may have a refractive index which is the same as or higher than that of the low refractive index resin layer and is the same as or lower than that of the high refractive index resin layer. Although not shown in FIG. 1, the filling pattern and the engraved pattern may extend in a stripe shape, or may be formed in a dot shape. Herein, the term "dot" means that combinations of the filling patterns and the engraved patterns are dispersed.

The low refractive index resin layer 120 may have a refractive index of less than about 1.52, specifically about 1.35 to less than about 1.50. Within this range of refractive index, the optical film can secure a high light diffusing effect and can be easily produced while significantly improving diffusion of polarized light and contrast ratio. The low refractive index resin layer 120 may be formed of a UV-curable or thermosetting composition including a transparent resin. Specifically, the transparent resin may include at least one of a (meth)acrylic resin, a polycarbonate resin, a silicone resin, and an epoxy resin, without being limited thereto. The transparent resin may have a light transmittance of about 90% or higher after curing. The low refractive index resin layer 120 may be formed of a non-adhesive resin or may be formed of an inherently adhesive resin exhibiting inherent adhesion so as to facilitate interlayer coupling or so as to eliminate an adhesive/bonding layer upon interlayer coupling, thereby reducing the thickness of the optical film for improving contrast ratio. Examples of the inherently adhesive resin may include an acrylic resin, an epoxy resin, and a urethane resin.

Although not shown in FIG. 1, at least one of the low refractive index resin layer and the high refractive index resin layer may further include a light diffusing agent. The light diffusing agent can further improve the light diffusing effect of the optical film. The light diffusing agent may include one or more of an organic light diffusing agent, an inorganic light diffusing agent, or an organic-inorganic hybrid diffusing agent.

The base layer 200 is formed on the contrast ratio improvement layer 100 to protect the contrast ratio improvement layer 100 while supporting the contrast improvement layer 100. The base layer 200 is a light passing layer and allows light having passed through the contrast ratio improvement layer 100 to pass therethrough.

The base layer 200 may be integrated with the contrast ratio improvement layer 100. Herein, the term "integrated" means a structure wherein the base layer and the contrast ratio improvement layer are not independently separated from each other. The base layer 200 may be a retardation film providing a certain range of retardation or an isotropic optical film. In one embodiment, the base layer may have an in-plane retardation Re of about 8,000 nm or more, specifically about 10,000 nm or more, more specifically higher than about 10,000 nm, still more specifically about 10,100 nm to about 15,000 nm. Within this range, the base layer can prevent generation of rainbow spots and can improve the effect of diffusing light having passed through the contrast ratio improvement layer. In other embodiments, the base layer 200 may have an in-plane retardation Re of about 60 nm or less, specifically about 0 nm to about 60 nm, more specifically about 40 nm to about 60 nm, thereby providing an isotropic optical film. Within this range of in-plane retardation, the base layer can provide good image quality through compensation for viewing angle. Herein, the term "isotropic optical film" means a film having substantially the same nx, ny and nz. Herein, the expression "substantially the same" include not only the case where nx, ny and nz are completely the same, but also the case where there is an acceptable margin of error between nx, ny and nz.

The base layer 200 may have a thickness of about 30 μm to about 120 μm, specifically about 55 μm to about 105 μm. Within this thickness range, the optical film including the base layer can be used in an optical display. The base layer 200 may have a light transmittance of about 80% or more, specifically about 85% to about 95%, in the wavelength band of visible light. The base layer 200 may include a film obtained by uniaxially or biaxially stretching an optically transparent resin film. Specifically, the resin may include at least one of polyesters including polyethylene terephthalate (PET), polybutylene terephthalate, polyethylene naphthalate, and polybutylene naphthalate, cellulose esters including acryl resins, cyclic olefin polymer (COP) resins and triacetylcellulose (TAC), polyvinyl acetate, polyvinyl chloride (PVC), polynorbornene, polycarbonate (PC), polyamide, polyacetal, polyphenylene ether, polyphenylene sulfide, polysulfone, polyether sulfone, polyacrylate, and polyimide. The base layer 200 may include a film produced through modification of at least one resin selected from among these resins. Modification may include copolymerization, branching, crosslinking, or modification of molecular terminals.

Although not shown in FIG. 1, the base layer may include a base film and a primer layer formed on at least one surface of the base film. The base film supports the base layer and may have refractive index ratio in a predetermined range with respect to the primer layer, thereby improving transmittance of the base layer. Specifically, a refractive index ratio of the primer layer to the base film (refractive index of the primer layer/refractive index of the base film) may be about 1.0 or less, specifically about 0.6 to about 1.0, more specifically about 0.69 to about 0.95, still more specifically about 0.7 to about 0.9, still more specifically about 0.72 to about 0.88. Within this range, the base film can improve transmittance of the base layer. The base film may have a refractive index of about 1.3 to about 1.7, specifically about 1.4 to about 1.6. Within this range, the base film can be applied to the base layer, can facilitate regulation of the refractive index with respect to the primer layer, and can improve transmittance of the base layer. The base film may be formed of the resins described above. The primer layer is formed between the base film and the high refractive index resin layer, and can reinforce adhesion between the base film and the high refractive index resin layer. The primer layer may have a refractive index of about 1.0 to about 1.6, specifically about 1.1 to about 1.6, more specifically about 1.1 to about 1.5. Within this range of refractive index, the primer layer can be used in the optical film and exhibit a suitable refractive index with respect to the refractive index of the base film, thereby improving transmittance of the base layer. The primer layer may have a thickness of about 1 nm to about 200 nm, specifically about 60 nm to about 200 nm. Within this thickness range, the primer layer can be used in the optical film and can exhibit a suitable refractive index with respect to the refractive index of the base film, thereby improving transmittance of the base layer without suffering from brittleness. The primer layer may be a non-urethane primer layer free from a urethane group. Specifically, the primer layer may be formed of a composition for the primer layer including resins, such as a polyester resin and an acryl resin, or monomers. The primer layer can secure the above refractive index by adjusting a mixing ratio of these monomers (for example: molar ratio). The composition for the primer layer may further include at least one additive such as a UV absorbent, an antistatic agent, an antifoaming agent, a surfactant, and the like.

Although not shown in FIG. 1, the optical film may further include a functional layer on the other surface of the base layer 200. The functional layer may be formed as a discrete layer or may be integrally formed with the base layer. The functional layer can provide at least one of anti-reflection, low reflection, hard coating, anti-glare, anti-fingerprint, anti-contamination, diffusion and refraction functions.

The optical film for improving contrast ratio 10 may have a light transmittance of about 80% or more, specifically about 85% to about 95%, in the wavelength band of visible light (for example: wavelength 380 nm to 780 nm). The optical film for improving contrast ratio 10 may have a thickness of about 50 µm to about 200 µm. Within this range, the optical film can secure the light diffusing effect.

Next, an optical film according to another embodiment of the present invention will be described with reference to FIG. 2. FIG. 2 is a cross-sectional view of an optical film according to another embodiment of the present invention.

Referring to FIG. 2, an optical film 20 according to this embodiment is substantially the same as the optical film 10 according to the above embodiment except further including an adhesive/bonding layer 250 on a lower surface of the contrast improvement layer 100.

The adhesive/bonding layer 250 is formed on the lower surface of the contrast ratio improvement layer 100 to attach the optical film for improving contrast ratio 20 to an optical device such as a polarizing plate. With this structure, the adhesive/bonding layer 250 allows internal light to enter the low refractive index resin layer before traveling towards the patterned portion of the high refractive index resin layer in the optical display. The adhesive/bonding layer 250 may include an adhesive layer, a bonding layer, or a combination stacked thereof. The adhesive/bonding layer 250 may be formed of a typical bonding agent known to those skilled in the art. For example, the bonding layer may include a thermosetting bonding agent or a light curable bonding agent. Specifically, the bonding layer may include a (meth) acrylic compound, an epoxy compound, a cyanoacrylate compound, an isocyanate compound, and the like. The adhesive layer may be formed of a pressure-sensitive adhesive including a (meth)acrylic adhesive resin, an epoxy resin, a urethane resin, and the like.

Next, an optical film according to a further embodiment of the present invention will be described with reference to FIG. 3. FIG. 3 is a cross-sectional view of an optical film according to a further embodiment of the present invention.

Referring to FIG. 3, an optical film 30 according to this embodiment is substantially the same as the optical film 10 according to the above embodiment except that the optical film 30 includes a contrast ratio improvement layer 100a, which includes a high refractive index resin layer 110a having a curved surface at an interface between an engraved pattern 111a and a flat portion 112a, and a low refractive index resin layer 120a. In the structure wherein the curved surface is formed at the interface between the engraved pattern 111a and the flat portion 112a, an angle between a flat portion of an inclined plane of the engraved pattern and the maximum width of the engraved pattern is defined as the base angle θ of the engraved pattern 111a.

Next, an optical film for improving contrast ratio according to yet another embodiment of the present invention will be described with reference to FIG. 4. FIG. 4 is a cross-sectional view of an optical film for improving contrast ratio according to yet another embodiment of the present invention.

Referring to FIG. 4, an optical film 40 for improving contrast ratio according to this embodiment is substantially the same as the optical film 10 according to the above embodiment except that the optical film 40 includes a contrast improvement layer 100b, which includes a high refractive index resin layer 110b including engraved patterns 111b, inclined planes of which are curved surfaces, and a low refractive index resin layer 120b. The structure of the engraved patterns including the curved surfaces can provide an effect of preventing rapid change in brightness. Although FIG. 4 shows the engraved pattern having a truncated lenticular lens (cut-lenticular lens) pattern, an inclined plane of which is a convexly curved surface, it should be understood that the present invention is not limited thereto. An angle between a tangential line I at a point corresponding to half (H) the height of the engraved pattern and the maximum width of the engraved pattern is defined as the base angle θ of the engraved pattern, which ranges from 75° to about 90°.

A polarizing plate according to the present invention may include the optical film for improving contrast ratio according to the above embodiments of the present invention.

Next, a polarizing plate according to one embodiment of the present invention will be described. FIG. 5 is a cross-sectional view of a polarizing plate according to one embodiment of the present invention.

Referring to FIG. 5, a polarizing plate 50 according to this embodiment includes a first protective layer 300, a polarizer 400, a second protective layer 500, an adhesive/bonding layer 250, and an optical film for improving contrast ratio, wherein the optical film for improving contrast ratio may include the contrast improvement layer 100 and the base layer 200 according to the present invention. In the structure wherein the polarizing plate includes the optical film for improving contrast ratio, polarized light having passed through the polarizer is diffused while sequentially passing through the low refractive index resin layer and the high refractive index resin layer, thereby improving the front contrast ratio and the side contrast ratio, reducing a difference between the front contrast ratio and the side contrast ratio, and improving contrast ratio at the same side viewing angle and the same front viewing angle. The polarizing plate 50 may have a thickness of about 150 μm to about 400 μm. Within this thickness range, the polarizing plate can be used in an optical display.

The first protective layer 300 can protect the polarizer 400 while increasing mechanical strength of the polarizing plate 50. The first protective layer 300 may have a total transmittance of about 90% or more, specifically about 90% to about 100%, in the wavelength band of visible light.

The first protective layer may be an isotropic film. The isotropic film may have an in-plane retardation Re of about 60 nm or less, for example, about 0 nm to about 60 nm. Alternatively, the first protective layer may be a retardation film. The retardation film may have in-plane retardation Re of about 100 nm to about 220 nm, more specifically about 100 nm to about 180 nm, and may be, for example, a λ/4 retardation film (that is, a quarter-wave plate, QWP). The retardation film may have an in-plane retardation Re of about 225 nm to about 350 nm, specifically about 225 nm to about 300 nm, and may be, for example, a λ/2 retardation film (that is, a half wave plate, HWP).

The first protective layer 300 may include at least one of an optically transparent protective film and an optically transparent protective coating layer.

In the structure wherein the first protective layer is realized by the protective film, the protective film may be formed of an optically transparent resin. The protective film may be produced through melt extrusion of the resin. The protective film may be subjected to stretching, as needed. The resin may include at least one of cellulose ester resins such as triacetylcellulose, cyclic polyolefin resins such as an amorphous cyclic olefin polymer (COP), polycarbonate resins, polyester resins such as polyethylene terephthalate (PET), polyethersulfone resins, polysulfone resins, polyamide resins, polyimide resins, non-cyclic polyolefin resins, polyacrylate resins such as poly(methyl) methacrylate, polyvinyl alcohol resins, polyvinyl chloride resins, and polyvinylidene resins. The protective film may be an optically transparent liquid crystal film.

In the structure wherein the first protective layer is realized by the protective coating layer, the protective coating layer can secure good properties in terms of adhesion to the polarizer, transparency, mechanical strength, thermal stability, moisture blocking performance, and durability. In one embodiment, the protective coating layer may be formed of an active-energy ray curable resin composition, which includes an active-energy ray curable compound and an an initiator. The active-energy ray curable compound may include at least one of cation polymerizable curable compounds, radical polymerizable curable compounds, urethane resins, and silicone resins. The cation polymerizable curable compounds may include at least one of an epoxy compound containing at least one epoxy group therein and an oxetane compound containing at least one oxetane ring therein. The radical polymerizable curable compound may be a (meth)acrylic compound having at least one (meth)acryloyloxy group therein. The epoxy compound may include at least one among hydrogenated epoxy compounds, aliphatic epoxy compounds, alicyclic epoxy compounds, and aromatic epoxy compounds. The radical polymerizable curable compound can realize a protective coating layer that exhibits excellent properties in terms of hardness, mechanical strength and durability. The radical polymerizable curable compound may be obtained by reacting a (meth)acrylate monomer having at least one (meth)acryloyloxy group with two or more types of functional group-containing compounds, and may include a (meth)acrylate oligomer which has at least two (meth)acryloyloxy groups therein. Examples of the (meth)acrylate monomer include a monofunctional (meth)acrylate monomer having a single (meth)acryloyloxy group, a bifunctional (meth)acrylate monomer having two (meth)acryloyloxy groups, and a polyfunctional (meth)acrylate monomer having three or more (meth)acryloyloxy groups. The (meth)acrylate oligomer may include a urethane (meth)acrylate oligomer, a polyester (meth)acrylate oligomer, an epoxy (meth)acrylate oligomer, and the like. The initiator can cure the active-energy ray curable composition. The initiator may include at least one of a photo-cationic polymerization initiator and a photosensitizer.

As the photo-cationic polymerization initiator, any typical photo-cationic polymerization initiator known in the art may be used without limitation. Specifically, the photo-cationic polymerization initiator may include an onium salt containing a cation and an anion. Examples of the cation may include: diaryliodonium such as diphenyliodonium, 4-methoxydiphenyliodonium, bis(4-methylphenyl)iodonium, bis(4-tert-butylphenyl)iodonium, bis(dodecylphenyl) iodonium and (4-methylphenyl)[(4-(2-methylpropyl)phenyl)iodonium; triarylsulfonium such as triphenylsulfonium and diphenyl-4-thiophenoxyphenylsulfonium; bis[4-(diphenylsulfonio)-phenyl]sulfide; and the like. Examples of the anion may include hexafluorophosphate, tetrafluoroborate, hexafluoroantimonate, hexafluoroarsenate, hexachloroantimonate, and the like. As the photosensitizer, any typical photosensitizer known in the art may be used without limitation. Specifically, the photosensitizer may include at least one of thioxanthone, phosphorus, triazine, acetophenone, benzophenone, benzoin, and oxime photosensitizer. The initiator may be present in an amount of about 0.01 parts by weight to about 10 parts by weight based on 100 parts by weight of the active energy ray-curable compound. Within this range, the initiator can secure sufficient curing of the composition to provide high mechanical strength and good adhesion to the polarizer. The active energy ray-curable resin composition may further include typical additives such as a silicone leveling agent, a UV absorbent, an antistatic agent, and the like. The additives may be present in an amount of 0.01 parts by weight to about 1 part by weight based on 100 parts by weight of the active energy ray-curable compound. The protective coating layer may be a liquid crystal coating layer.

The first protective layer 300 may have a thickness of about 5 μm to about 200 μm, specifically about 30 μm to about 120 μm. The first protective layer may have a thickness of about 50 μm to about 100 μm when realized by the protective film and a thickness of about 5 μm to about 50 μm when realized by the protective coating layer. Within this thickness range, the first protective layer can be used in a light emitting display.

Although not shown in FIG. 5, the aforementioned functional layer may be further formed on an upper surface of the first protective layer. In addition, although not shown in FIG. 5, in the structure wherein the first protective layer is realized by the protective film, a bonding layer may be further formed between the first protective layer and the polarizer. The bonding layer may be formed of a typical bonding agent for polarizing plates, for example, a water-based bonding agent, a photocurable bonding agent, and a pressure sensitive bonding agent.

The polarizer 400 is formed on the first protective layer 300 and can polarize incident light and may include a typical polarizer known to those skilled in the art. Specifically, the polarizer may include a polyvinyl alcohol-based polarizer produced by uniaxially stretching a polyvinyl alcohol-based film, or a polyene-based polarizer produced by dehydration of the polyvinyl alcohol-based film. The polarizer 400 may have a thickness of about 5 μm to about 40 μm. Within this range, the polarizer can be used in an optical display.

The second protective layer 500 is formed on the polarizer 400 and can protect the polarizer while improving mechanical strength of the polarizing plate. The second protective layer may include at least one of a protective film and a protective coating layer as described in the first protective layer, and may have the same or different features in terms of thickness, material and retardation from the first protective layer 300. Although FIG. 5 shows the polarizing plate including the second protective layer 500, a polarizing plate according to another embodiment can eliminate the second protective layer in the structure wherein the low refractive index resin layer 120 is formed of the thermosetting composition or the UV-curable composition according to the composition thereof. As shown in FIG. 6, a polarizing plate 60 according to this embodiment may include a first protective layer 300, a polarizer 400, an adhesive/bonding layer 250, a contrast ratio improvement layer 100, and a base layer 200, which are sequentially stacked in this order. In a polarizing plate 70 according to a further embodiment wherein the low refractive index resin layer 120 is formed of the inherent adhesive resin, a polarizer 400 directly adjoins a contrast ratio improvement layer 100 such that a first protective layer 300, the polarizer 400, the contrast ratio improvement layer 100, and a base layer 200 are sequentially stacked in this order, as shown in FIG. 7.

The adhesive/bonding layer 250 may be interposed between the second protective layer 500 and the low refractive index resin layer so as to maintain adhesion between the second protective layer 500 and the contrast ratio improvement layer 100. The adhesive/bonding layer is the same as described above. In the structure wherein the contrast ratio improvement layer 100 includes the low refractive index resin layer exhibiting inherent adhesion as described above, the adhesive/bonding layer can be omitted. According to this embodiment, a polarizing plate 80 includes a first protective layer 300, a polarizer 400, a second protective layer 500, a contrast ratio improvement layer 100, and a base layer 200, which are sequentially stacked in this order such that the second protective layer 500 directly adjoins the contrast ratio improvement layer 100, as shown in FIG. 8.

A liquid crystal display according to the present invention may include the optical film for improving contrast ratio according to the present invention or the polarizing plate according to the present invention. In one embodiment, the liquid crystal display may include a backlight unit, a first polarizing plate, a liquid crystal panel, and a second polarizing plate, which are sequentially stacked in this order, wherein the second polarizing plate includes the polarizing plate according to the present invention. The liquid crystal panel includes a first substrate, a second substrate, and a liquid crystal layer secured between the first substrate and the second substrate and acting as a display medium. The first substrate may include a color filter and a black matrix mounted thereon. The second substrate may include a switching device configured to control electro-optical characteristics of liquid crystals, an injection line configured to supply gate signals to the switching device and a signal line in order to provide a source signal, a pixel electrode, and a counter electrode. The liquid crystal layer may include liquid crystals evenly aligned upon application of no electric field. Specifically, the liquid crystal panel may adopt a vertical alignment (VA) mode, an IPS mode, a patterned vertical alignment (PVA) mode, or a super-patterned vertical alignment (S-PVA) mode, without being limited thereto.

Next, a liquid crystal display according to one embodiment of the present invention will be described with reference to FIG. 9. FIG. 9 is a perspective view of a liquid crystal display according to one embodiment of the present invention.

Referring to FIG. 9, a liquid crystal display 90 according to this embodiment includes a light source 650, a light guide plate 600, a prism sheet 700, a first polarizing plate 900, a liquid crystal panel 800, and a second polarizing plate 950, wherein the second polarizing plate 950 may include the optical film for improving contrast ratio according to the embodiments of the present invention. The liquid crystal display according to this embodiment includes the optical film for improving contrast ratio, thereby improving both relative brightness and front contrast ratio even in the structure wherein the liquid crystal display includes the prism sheet 700.

The prism sheet 700 is disposed on the light guide plate 600 and can collect light received from a light exit plane of the light guide plate 600. The prism sheet 700 includes a first light incidence plane facing the light guide plate 600, a first light exit plane facing the first light incidence plane, and one or more prisms formed on the first light incidence plane so as to provide an inverted prism sheet structure.

Next, the prism sheet according to this embodiment will be described with reference to FIG. 10.

Referring to FIG. 10, the prism sheet 700 according to this embodiment may include a base film 701 and a prism portion 703. An upper surface of the base film 701 constitutes the first light exit plane and the prism portion 703 constitutes the first light incidence plane. The prism portion is formed on the first light incidence plane, thereby improving efficiency in collection and diffusion of light even in the structure wherein the liquid crystal display includes an edge type light source, as in FIG. 10.

The base film 701 supports the prism sheet 700 and may have a thickness of about 50 μm to about 250 μm, specifically about 100 μm to about 200 μm, without being limited thereto. Within this range, the base film can be used in the liquid crystal display. The base film 701 may be formed of a transparent compound including a transparent thermoplastic resin or a composition including the same. Specifically, the thermoplastic resin may include at least one of polyester resins such as polyethylene terephthalate and polyethylene naphthalate, polyacetal resins, acrylic resins, polycarbonate resins, styrene resins, vinyl resins, polyphenylene ether resins, non-cyclic polyolefin resins such as polyethylene and polypropylene, cyclic olefin resins, acrylonitrile-butadiene-styrene copolymer resins, polyarylsulfone resins, polyethersulfone resins, polyphenylene sulfide resins, fluorine-based resins, and (meth)acrylic resins. The upper surface of the base film 701 constitutes the first light exit plane. Preferably, the first light exit plane is a flat surface on which prisms are not formed.

The prism portion 703 is formed on a lower surface of the base film 701 on the light guide plate 600 so as to face the light guide plate 600 such that light received from a second light exit plane of the light guide plate 600 can be directed to the first light exit plane through the prism portion 703. An upper surface of the prism portion 703 is a flat surface and is bonded to the lower surface of the base film 701. A lower surface of the prism portion 703 constitutes the first light incidence plane and has one or more prisms 702 arranged thereon.

The prism portion 703 may include one or more prisms 702 and a valley 704 formed between the prisms 702.

The prisms 702 are disposed to face the light guide plate 600 and collect light received from the light guide plate 600. Light having passed through the prisms 702 is diffused through the liquid crystal panel 800, thereby improving the side contrast ratio, the front contrast ratio, and the viewing angle of the liquid crystal display.

The prisms 702 may be an optical pattern having a triangular cross-section.

Although FIG. 10 shows the optical pattern having a triangular cross-section, it should be understood that the present invention is not limited thereto. The prisms may have a polygonal cross-section, the number of sides of which ranges from 4 to 10. Although FIG. 10 shows the optical pattern of prisms having a sharp top part, the prisms may have a rounded top part.

The prism 702 includes two prism planes 702a, 702b. Each of the prism planes 702a, 702b is an optically flat surface and one or more of the prism planes 702a, 702b may be inclined with respect to a direction L1 (in FIG. 10) perpendicular to the first light exit plane. Specifically, an angle 81 defined between the prism plane 702a and direction L1 perpendicular to the first light exit plane may range from about 53° to about 60°, specifically from about 55° to about 58°. Within this range, the prisms can more efficiently collect light in the front direction of the liquid crystal display (the z-axis direction in FIG. 9), thereby improving the front contrast ratio of the liquid crystal display.

The prisms 702 may have an aspect ratio of about 0.65 to about 0.85, specifically about 0.7 to about 0.8. Within this range of aspect ratio, the prisms can more efficiently collect light in the front direction of the liquid crystal display (the z-axis direction in FIG. 9), thereby improving the front contrast ratio of the liquid crystal display.

The prisms 702 may have a pitch P1 of about 7 μm to about 30 μm, specifically about 10 μm to about 20 μm. The prisms 702 may have a height H1 of about 4 μm to about 25 μm, specifically about 7 μm to about 16 μm. The prisms 702 may have a vertex angle 82 of about 63° to about 70°, specifically about 65° to about 68°. Within these ranges of pitch, height and vertex angle, the prisms can more efficiently collect light in the front direction of the liquid crystal display (the z-axis direction in FIG. 9), thereby improving the front contrast ratio of the liquid crystal display.

The prisms 702 may be formed of the same or different materials as the base film 701, or may be formed of a composition including a UV-curable unsaturated compound and an initiator. In one embodiment, the UV-curable unsaturated compound may include epoxy (meth)acrylate, urethane (meth)acrylate, phenylphenol ethoxylated (meth)acrylate, trimethylolpropane ethoxylated (meth)acrylate, fluorene derivative unsaturated resins, phenoxybenzyl (meth)acrylate, phenylphenoxyethyl (meth)acrylate, ethoxylated thiodiphenyl di(meth)acrylate, phenylthioethyl (meth)acrylate, or oligomers thereof, without being limited thereto. The initiator is a photo initiator and may include ketone initiators and phosphine oxide initiators, without being limited thereto.

The prisms 702 may be arranged in the same direction as a light emitting direction of the light source 650.

The valley 704 may have a vertex angle 83 of about 63° to about 70°, specifically about 65° to about 68°. With the valley having a vertex angle ($\theta 3$) within this range, the prisms can more efficiently collect light in the front direction of the liquid crystal display (the z-axis direction in FIG. 9), thereby improving the front contrast ratio.

The liquid crystal panel 800 is disposed between the first polarizing plate 900 and the second polarizing plate 950 so as to allow light received from the first polarizing plate 900 through the prism sheet 700 to be directed towards the second polarizing plate 950 therethrough. The liquid crystal panel 800 has the same structure as described above.

The light guide plate 600 is placed at a side of the light source 650 so as to guide light received from the light source 650 to be directed towards the prism sheet 700 through internal reflection by the light guide plate 600.

The light guide plate 600 is configured to allow light to exit therefrom at a light exit angle of about 50° to about 90°, specifically about 60° to about 80° without scattering, thereby improving brightness of the liquid crystal display even in the structure wherein the liquid crystal display includes the prism sheet 700. Referring to FIG. 11, the term "light exit angle" means an angle $\theta$ defined between a direction L2 perpendicular to the light exit plane of the light guide plate 600 (a front side of the liquid crystal display) and a light exit direction, assuming that the direction L2 is 0°.

The light guide plate 600 has a second light incidence plane facing the light source 650 and a second light exit plane orthogonal to the second light incidence plane and facing the prisms 702 of the prism sheet 700. The light guide plate 600 may include a base layer 601, a lenticular lens pattern 602, and a microlens pattern 603. Although FIG. 9 shows the light guide plate that includes the lenticular lens pattern 602 formed on the second light exit plane and the microlens pattern 603 formed on a surface facing the second light exit plane, it should be understood the present invention is not limited thereto.

The base layer 601 may be formed between the lenticular lens pattern 602 and the microlens pattern 603 so as to support the lenticular lens pattern 602 and the microlens pattern 603. An upper surface of the base layer 601 may constitute the second light exit plane, a side surface of the base layer 601 may constitute the second light incidence plane, and a lower surface of the base layer 601 may be a light incidence plane which receives light from the microlens pattern 603. The base layer 601 may have a thickness of about 1,000 μm to about 4,000 μm, specifically about 2,000 μm to about 3,000 μm. Within this thickness range, the base layer can be used in an optical display. The base layer 601 may include a film formed of an optically transparent resin. Specifically, the resin may include at least one of polycarbonate, polymethyl(meth)acrylate (PMMA), polystyrene, and a copolymer resin of methyl methacrylate and styrene (MS resin).

The lenticular lens pattern 602 is formed on the upper surface of the base layer 601 so as to guide exit of light received from the base layer 601 without scattering the light, thereby improving brightness. Although FIG. 9 shows the light guide plate having the lenticular lens pattern as a first optical pattern, the first optical pattern may include an optical pattern having a curved surface at a top part thereof. For example, the first optical pattern may include a prism pattern having an n-gonal cross-section (n being an integer of 3 to 10), a top part of which has a curved surface. The lenticular lens pattern 602 may have an aspect ratio of about 0.10 to about 0.50 and a radius of curvature of about 20 μm to about 200 μm, specifically about 50 μm to about 150 μm. Within these ranges, the lenticular lens pattern can serve to guide and diffuse incident light, and can reduce viewing angle in the vertical direction, thereby improving visibility and brightness. The lenticular lens pattern 602 may have a maximum pitch of about 100 μm to about 300 μm and a maximum height of about 10 μm to about 150 μm. Within these ranges, the lenticular lens pattern 602 can collect light in the lateral direction so as to improve light efficiency, can serve to guide and diffuse incident light, and can reduce viewing angle in the vertical direction, thereby improving visibility and brightness. The lenticular lens pattern 602 may be formed of the same or different optically transparent resin than the base layer 601.

The microlens pattern 603 is formed on the lower surface of the base layer 601 so as to collect light received from the side surface of the light guide plate. Although FIG. 9 shows the light guide plate having the microlens pattern as a second optical pattern in this embodiment, the second optical pattern may include a prism pattern or a lenticular lens pattern, which has an n-gonal cross-section (n being an integer of 3 to 10) in other embodiments. The microlens pattern 603 may have an aspect ratio of about 0.01 to about 0.20, specifically about 0.01 to about 0.10. Within this range of aspect ratio, the microlens pattern 603 can improve efficiency in collection of light received from the light guide plate. The microlens pattern 603 may have a width of about 100 μm to about 400 μm and a height of about 1 μm to about 50 μm. Within these ranges of width and height of the microlens pattern, the prism sheet can provide a light collection effect. The microlens pattern 603 may be formed of the same or different optically transparent resin than the base layer 601.

The base layer 601, the lenticular lens pattern 602, and the microlens pattern 603 may be integrally formed with one another. Herein, the expression "integrally formed with" means that any bonding layer is not interposed between the base layer 601, the lenticular lens pattern 602 and the microlens pattern 603, and that the base layer 601, the lenticular lens pattern 602 and the microlens pattern 603 are not independently separated from each other. To this end, the light guide plate 600 may be produced by forming the microlens pattern 603 on one surface of the base layer 601, which has the lenticular lens pattern 602 formed on the other surface thereof through extrusion, by laser machining or the like. Extrusion and laser machining may be performed by typical methods in the art.

The light source 650 generates light and may be disposed at one side of the light guide plate 600. That is, the light source may be disposed to face the second light incidence plane of the light guide plate 600. The light source 650 may be a linear light lamp, a sheet-light lamp, or various other light sources such as CCFL or LED. A light source cover may be disposed outside the light source 650 to protect the light source 600. Although FIG. 9 shows the light source 650 disposed only on one side of the light guide plate 600, the light source 650 may also be disposed on the other side of the light guide plate 600 (opposite the one side of the light guide plate).

The first polarizing plate 900 is disposed between the prism sheet 700 and the liquid crystal panel 800 such that the first polarizing plate 900 is placed on the prism sheet and under the liquid crystal panel, and can polarize light received from the prism sheet 700. The first polarizing plate 900 may include a polarizer and a first protective layer or a second protective layer formed on at least one surface of the polarizer.

The second polarizing plate 950 is disposed on the liquid crystal panel 800 and can polarize and diffuse light received from the liquid crystal panel 800 through the prism sheet 700. The second polarizing plate 950 includes the optical film for improving contrast ratio according to the embodiments of the present invention in order to improve relative brightness and front contrast ratio. The second polarizing plate 950 may include the polarizing plate according to the embodiment of the present invention.

Although not show in FIG. 9, each of the first polarizing plate 900 and the second polarizing plate 950 may be attached to the liquid crystal panel 800 via an adhesive/bonding layer. Further, although not shown in FIG. 9, a reflective sheet may be disposed on a lower side of the light guide plate 600. The reflective sheet can reflect light emitted from the light source 650 towards the light guide plate 600, thereby improving luminous efficacy.

Hereinafter, the present invention will be described in more detail with reference to some examples. However, it should be understood that these examples are provided for illustration only and are not to be construed in any way as limiting the present invention.

Example 1

A UV-curable resin (SSC-5760, Shin-A T&C) was coated onto one surface of a PET film (thickness: 80 μm, Re=14,000 nm at a wavelength of 550 nm, Toyobo Co., Ltd.) to form a coating layer. Then, using a film having a patterned portion, which includes embossed patterns having the same base angles at both sides thereof and a flat portion formed between the embossed patterns, engraved patterns and a flat portion were formed on the coating layer, followed by curing, thereby forming a high refractive index resin layer including a patterned portion, which includes engraved patterns having the same base angles at both sides thereof as listed in Table 1 (engraved patterns having a trapezoidal cross-section as shown in FIG. 1) and a flat portion formed therebetween. Then, a UV-curable resin (SSC-4560, Shin-A T&C) was coated onto the high refractive index resin layer such that the engraved pattern could be completely filled with the UV-curable resin, followed by curing, thereby forming an optical film for improving contrast ratio, which includes a low refractive index resin layer having a filling pattern completely filling the engraved patterns.

A polarizer was produced by stretching a polyvinyl alcohol film at 60° C. to three times an initial length thereof and adsorbing iodine to the stretched film, followed by stretching the resulting film to 2.5 times the stretched length of the film in an aqueous solution of boric acid at 40° C.

A bonding agent for polarizing plates (Z-200, Nippon Goshei Co., Ltd.) was deposited onto both surfaces of the polarizer, followed by bonding a COP film (ZEON Company) and a PET film (thickness: 80 μm, Toyobo Co., Ltd.) as first and second protective layers to both surfaces of the polarizer via the bonding layers, respectively.

An adhesive layer was formed on one surface of the low refractive index resin layer of the optical film for improving contrast ratio by depositing an acrylic resin adhesive thereon and the PET film provided as the second protective layer was attached to thereto via the adhesive layer, thereby providing a polarizing plate including the COP film, the bonding layer, the polarizer, the bonding layer, the PET film, the adhesive layer, the low refractive index resin layer, the high refractive index resin layer, and the PET film sequentially stacked in this order.

Examples 2 to 3 and 7 to 11

Polarizing plates were produced in the same manner as in Example 1 excluding the engraved patterns and the flat portion changed as listed in Table 1.

Example 4

An optical film was produced in the same manner as in Example 1 except that the engraved patterns and the flat portion were changed as listed in Table 1 and the low refractive index resin layer was formed of an acrylic adhesive resin.

A polarizer was produced in the same manner as in Example 1, and a bonding agent for polarizing plates (Z-200, Nippon Goshei Co., Ltd.) was deposited onto both surfaces of the polarizer, followed by bonding a COP film (ZEON Company) and a PET film (thickness: 80 µm, Toyobo Co., Ltd.) as first and second protective layers to both surfaces of the polarizer via the bonding layers, respectively.

The PET film provided as the second protective layer was attached to the low refractive index resin layer, thereby providing a polarizing plate including the COP film, the bonding layer, the polarizer, the bonding layer, the PET film, the low refractive index resin layer, the high refractive index resin layer, and the PET film sequentially stacked in this order.

Example 5

An optical film was produced in the same manner as in Example 1 excluding the engraved patterns and the flat portion changed as listed in Table 1.

A polarizer was produced in the same manner as in Example 1, and a bonding agent for polarizing plates (Z-200, Nippon Goshei Co., Ltd.) was deposited onto one surface of the polarizer, followed by bonding a COP film (ZEON Company) as a first protective layer thereto via the bonding layer. In addition, the bonding agent was deposited onto the other surface of the polarizer, followed by bonding the low refractive index resin layer to the other surface of the polarizer via the bonding layer, thereby providing a polarizing plate including the COP film, the bonding layer, the polarizer, the bonding layer, the low refractive index resin layer, the high refractive index resin layer, and the PET film sequentially stacked in this order.

Example 6

An optical film was produced in the same manner as in Example 1 except that the engraved patterns and the flat portion were changed as listed in Table 1 and the low refractive index resin layer was formed of an acrylic adhesive resin.

A polarizer was produced in the same manner as in Example 1, and a bonding agent for polarizing plates (Z-200, Nippon Goshei Co., Ltd.) was deposited onto one surface of the polarizer, followed by bonding a COP film (ZEON Company) as a first protective layer thereto via the bonding layer. In addition, the low refractive index resin layer was bonded to the other surface of the polarizer, thereby providing a polarizing plate including the COP film, the bonding layer, the polarizer, the low refractive index resin layer, the high refractive index resin layer, and the PET film sequentially stacked in this order.

Comparative Example 1

A polarizing plate was manufactured in the same manner as in Example 1 excluding the engraved patterns and the flat portion changed as listed in Table 1.

Reference Example 1

A polarizing plate was manufactured in the same manner as in Example 1 except that the optical film for improving contrast ratio was not used.

Liquid crystal display modules were manufactured using the polarizing plates of Examples and Comparative Examples.

Preparative Example 1: Manufacture of Optical Sheet

A composition comprising 35 wt % of epoxy acrylate, 15 wt % of a urethane acrylate oligomer, 36 wt % of ortho-phenylphenol ethoxylated acrylate, 10 wt % of trimethylolpropane 9-ethoxylated acrylate, and 4 wt % of a photoinitiator was prepared. The composition was coated onto one surface of a PET film (T910E, thickness: 125 µm, Mitsubishi Co., Ltd.) to form a coating layer. A prism pattern (triangular cross-section, height: 12 µm, pitch: 24 µm, vertex angle: 90°) was transferred from a pattern roll having an embossed pattern corresponding to the prism pattern to the coating layer, followed by curing, thereby forming a first optical sheet having a first prism pattern formed thereon. The composition was coated onto one surface of a PET film (T910E, thickness: 125 µm, Mitsubishi Co., Ltd.) to form a coating layer. A prism pattern (triangular cross-section, height: 12 µm, pitch: 24 µm, vertex angle: 90°, aspect ratio: 0.5) was transferred from a pattern roll having an embossed pattern corresponding to the prism pattern to the coating layer, followed by curing, thereby forming a second optical sheet having a second prism pattern formed thereon. An optical sheet was manufactured by stacking the second optical sheet on the first optical sheet such that the longitudinal direction of the first prism pattern was orthogonal to the longitudinal direction of the second prism pattern.

Preparative Example 2: Manufacture of First Polarizing Plate

A first polarizer was produced by stretching a polyvinyl alcohol film at 60° C. to three times an initial length thereof and adsorbing iodine to the stretched film, followed by stretching the resulting film to 2.5 times the stretched length of the film in an aqueous solution of boric acid at 40° C. A first polarizing plate was manufactured by bonding triacetylcellulose films (thickness: 80 µm) to both surfaces of the first polarizer via a bonding agent for polarizing plates (Z-200, Nippon Goshei Co., Ltd.).

Preparative Example 3: Manufacture of Liquid Crystal Display Module

The composite optical sheet of Preparative Example 1, the first polarizing plate of Preparative Example 2, a liquid crystal panel (PVA mode), and the polarizing plates produced in Examples and Comparative Examples were sequentially assembled, thereby fabricating a liquid crystal display module.

Schematic configurations of the liquid crystal display modules are provided in Tables 1 and 2. The liquid crystal display modules manufactured in Examples and Comparative Examples were evaluated as to the following properties, and evaluation results are shown in Tables 1 and 2.

(1) Relative brightness: An LED light source, a light guide plate, and a liquid crystal display module were assembled to fabricate a liquid crystal display including an edge type LED light source at one side thereof (having the same configuration as a Samsung LED TV (UN32H5500) except for the configuration of the liquid crystal display modules manufactured in Examples and Comparative Example 1. Front brightness was measured in a white mode and a black mode in a spherical coordinate system (0°, 0°) using an EZ CONTRAST X88RC (EZXL-176R-F422A4, ELDIM Co., Ltd.). Relative brightness was calculated by {(brightness of Examples or Comparative Example 1)/(brightness of Reference Example 1)}×100. A target relative brightness value was 90% or more.

(2) Contrast ratio: A liquid crystal display was manufactured in the same manner as in (1) and contrast ratio was measured in a spherical coordinate system (Φ, θ) using an EZ CONTRAST X88RC (EZXL-176R-F422A4, ELDIM Co., Ltd.). A target side contrast ratio was 110 or more and a target front contrast ratio was 85 or more.

TABLE 1

| | | Example 1 | Example 2 | Example 3 | Example 4 | Example 5 | Example 6 |
|---|---|---|---|---|---|---|---|
| High refractive index resin layer | Shape of engraved pattern | Cut-prism | Cut-prism | Cut-prism | Cut-prism | Cut-prism | Cut-prism |
| | Width of first surface (flat surface) of engraved pattern (μm) | 7 | 6 | 8 | 7 | 7 | 7 |
| | Maximum width of engraved pattern (μm, W) | 7 | 6 | 8 | 7 | 7 | 7 |
| | Height of engraved pattern (μm) | 7 | 7 | 7 | 6 | 8 | 7 |
| | Width of flat portion (μm) | 7 | 7 | 6 | 7 | 7 | 3 |
| | Cycle (μm, P) | 14 | 14 | 14 | 14 | 14 | 10 |
| | Base angle of engraved pattern (°) | 90 | 90 | 90 | 90 | 90 | 90 |
| | P/W | 2 | 2.33 | 1.75 | 2 | 2 | 1.43 |
| | Refractive index | 1.59 | 1.59 | 1.59 | 1.59 | 1.59 | 1.59 |
| Low refractive index resin layer | Refractive index | 1.47 | 1.47 | 1.47 | 1.47 | 1.47 | 1.47 |
| Relative brightness at front side in white mode (%) | | 99 | 99 | 99 | 99 | 99 | 99 |
| Relative brightness at front side in black mode (%) | | 99 | 99 | 99 | 99 | 99 | 99 |
| Front contrast ratio (0°, 0°) | | 100 | 100 | 100 | 100 | 100 | 100 |
| Side contrast ratio (0°, 60°) | | 173 | 173 | 170 | 159 | 183 | 158 |

TABLE 2

| | | Example 7 | Example 8 | Example 9 | Example 10 | Example 11 | Comparative Example 1 | Reference Example 1 |
|---|---|---|---|---|---|---|---|---|
| High refractive index resin layer | Shape of engraved pattern | Cut-prism | Cut-prism | Cut-prism | Cut-prism | Cut-lenticular | Cut-prism | — |
| | Width of first surface (flat surface) of engraved pattern (μm) | 5 | 5 | 5 | 5 | 4.3 | 4.1 | — |
| | Maximum width of engraved pattern (μm, W) | 7 | 7 | 7 | 7 | 8.2 | 7 | — |
| | Height of engraved pattern (μm) | 7 | 7 | 7 | 7 | 7 | 4 | — |
| | Width of flat portion (μm) | 7 | 15 | 23 | 43 | 5.8 | 7 | — |
| | Cycle (μm, P) | 14 | 22 | 30 | 50 | 14 | 14 | — |
| | Base angle of engraved pattern (°) | 82 | 82 | 82 | 82 | 82 | 70 | — |
| | P/W | 2 | 3.14 | 4.29 | 7.14 | 1.71 | 2 | — |
| | Refractive index | 1.59 | 1.59 | 1.59 | 1.59 | 1.59 | 1.59 | — |
| Low refractive index resin layer | Refractive index | 1.47 | 1.47 | 1.47 | 1.47 | 1.47 | 1.47 | — |
| Relative brightness at front side in white mode (%) | | 97 | 98 | 98 | 99 | 96 | 82 | 100 |
| Relative brightness at front side in black mode (%) | | 110 | 106 | 103 | 103 | 112 | 101 | 100 |
| Front contrast ratio (0°, 0°) | | 88 | 92 | 95 | 96 | 86 | 81 | 100 |
| Side contrast ratio (0°, 60°) | | 161 | 130 | 121 | 112 | 155 | 129 | 100 |

As shown in Tables 1 and 2, the optical films and the polarizing plates according to the present invention could increase relative brightness and side contrast ratio while minimizing decrease in side contrast ratio and front contrast ratio.

Preparative Example 4: Manufacture of Light Guide Plate

A light guide plate was produced by forming a microlens pattern (width: 350 μm, height: 15 μm, aspect ratio: 0.04) on a lower surface of a poly(methyl) methacrylate (PMMA) film (thickness: 3,000 μm), which has a lenticular lens pattern (width: 150 μm, height: 34 μm, aspect ratio: 0.23, radius of curvature: 100 μm) on an upper surface thereof, by laser machining.

Preparative Example 5: Manufacture of Prism Sheet

A UV-curable resin (refractive index: 1.55) was coated onto a pattern roll having an engraved prism pattern (width: 17 μm, height: 12.6 μm, vertex angle: 68°, triangular cross-section). The coating layer was brought into contact with one surface of a polyethylene terephthalate (PET) film (thickness: 125 μm), followed by irradiation with UV light at a dose of 200 mJ, thereby providing a prism sheet having a prism pattern on the one surface of the PET film.

Example 12

A polarizing plate was manufactured in the same manner as in Example 1. A liquid crystal display was manufactured by sequentially stacking the light guide plate of Preparative Example 4, the prism sheet of Preparative Example 5, the first polarizing plate of Preparative Example 2, the liquid crystal panel, and the polarizing plate of Example 1. Here, the lenticular lens pattern of the light guide plate was disposed to face the prism pattern of the prism sheet (the prism sheet of Preparative Example 5 was an inverted prism sheet). In addition, the COP film of the polarizing plate of Example 1 was attached to the liquid crystal panel.

Example 13

A liquid crystal display was manufactured in the same manner as in Example 12 except that the polarizing plate of Example 7 was used instead of the polarizing plate of Example 1.

Example 14

A liquid crystal display was manufactured in the same manner as in Example 12 except that the polarizing plate of Example 8 was used instead of the polarizing plate of Example 1.

Example 15

A liquid crystal display was manufactured in the same manner as in Example 12 except that the polarizing plate of Example 11 was used instead of the polarizing plate of Example 1.

Comparative Example 2

A liquid crystal display was manufactured in the same manner as in Example 12 except that the polarizing plate of Comparative Example 1 was used instead of the polarizing plate of Example 1.

Reference Example 2

A liquid crystal display was manufactured in the same manner as in Example 12 except that the polarizing plate of Reference Example 1 was used instead of the polarizing plate of Example 1.

The liquid crystal displays manufactured in Examples and Comparative Example were evaluated as to the following properties, and evaluation results are shown in Table 3.

(1) Relative brightness: An LED light source and each of the liquid crystal displays of Examples and Comparative Example 2 were assembled to fabricate a liquid crystal display including an edge type LED light source at one side thereof (having the same configuration as a Samsung LED TV (UN32H5500) except for the configuration of the liquid crystal display modules of Examples and Comparative Example. Front brightness was measured using an EZ CON-TRAST X88RC (EZXL-176R-F422A4, ELDIM Co., Ltd.). Relative brightness was calculated by {(front brightness of Examples or Comparative Examples)/(front brightness of Reference Example 2)}×100.

(2) Percent of contrast ratio: A liquid crystal display was manufactured in the same manner as in (1) and front contrast ratios were measured in a spherical coordinate system ($\Phi$, $\theta$) using an EZ CONTRAST X88RC (EZXL-176R-F422A4, ELDIM Co., Ltd.). Percent of contrast ratio was calculated by {(front contrast ratio of Examples or Comparative Examples)/(front contrast ratio of Reference Example 2)}×100.

TABLE 3

|  | Example 12 | Example 13 | Example 14 | Example 15 | Comparative Example 2 | Reference Example 2 |
| --- | --- | --- | --- | --- | --- | --- |
| Prism sheet | Preparative Example 5 | Preparative Example 5 | Preparative Example 5 | Preparative Example 5 | Preparative Example 5 | Preparative Example 5 |
| Location of prism on prism sheet | Light incidence plane | Light incidence plane | Light incidence plane | Light incidence plane | Light incidence plane | Light incidence plane |
| Kind of polarizing plate | Example 1 | Example 7 | Example 8 | Example 11 | Comparative Example 1 | Reference Example 1 |
| Relative brightness (%) | 168 | 163 | 170 | 167 | 141 | 100 |
| Percent of front contrast ratio (0°, 0°) | 145 | 134 | 140 | 129 | 123 | 100 |

As shown in Table 3, the liquid crystal displays of Examples had high relative brightness and a higher percent of front contrast ratio than the liquid crystal display of Comparative Example 2.

It should be understood that various modifications, changes, alterations, and equivalent embodiments can be made by those skilled in the art without departing from the spirit and scope of the invention.

The invention claimed is:

1. An optical film for improving contrast ratio, comprising:
    a base layer and a contrast ratio improvement layer formed on the base layer,
    wherein the contrast ratio improvement layer comprises: a high refractive index resin layer including a patterned portion composed of one or more engraved patterns and a flat portion formed between the engraved patterns; and a low refractive index resin layer directly formed on the patterned portion,
    the low refractive index resin layer includes one or more filling patterns, the engraved pattern is completely filled with the filling pattern, and the engraved patterns have an aspect ratio of about 0.3 to about 3.0,
    the engraved patterns having a base angle of 75° to about 90°,
    the patterned portion having a P/W value of greater than about 1 to about 10 or less (P being the cycle of the patterned portion (unit: μm) and W being the maximum width of the engraved pattern (unit: μm)).

2. The optical film according to claim 1, wherein the patterned portion has a P/W value of about 1.2 to about 8.

3. The optical film according to claim 1, wherein the engraved patterns comprise an optical pattern composed of a first surface formed at a top part thereof and at least one inclined plane connected to the first surface, the inclined plane being a flat surface or a curved surface.

4. The optical film according to claim 3, wherein the first surface is a flat surface and is parallel to the flat portion.

5. The optical film according to claim 1, wherein a difference in refractive index between the high refractive index resin layer and the low refractive index resin layer ranges from about 0.10 to about 0.15.

6. The optical film according to claim 1, having a stack structure of the low refractive index resin layer, the high refractive index resin layer and the base layer sequentially stacked in this order, or a stack structure of the base layer, the low refractive index resin layer and the high refractive index resin layer sequentially stacked in this order,
    wherein the base layer directly adjoins the high refractive index resin layer or the low refractive index resin layer.

7. The optical film according to claim 1, wherein the base layer has an in-plane retardation Re of about 8,000 nm or more at a wavelength of 550 nm, as represented by Equation A:

$$Re = (nx - ny) \times d \qquad \text{<Equation A>}$$

(In Equation A, wherein nx and ny are refractive indexes of the base layer at a wavelength of 550 nm in the slow axis direction and the fast axis direction thereof, respectively, and d is the thickness of the base layer (unit: nm)).

8. A polarizing plate comprising the optical film for improving contrast ratio according to claim 1.

9. The polarizing plate according to claim 8, comprising: a first protective layer, a polarizer, a second protective layer, an adhesive/bonding layer, and the optical film for improving contrast ratio sequentially stacked in this order.

10. The polarizing plate according to claim 8, comprising: a first protective layer, a polarizer, a second protective layer, and the optical film for improving contrast ratio sequentially stacked in this order,
    wherein the second protective layer directly adjoins the optical film for improving contrast ratio.

11. The polarizing plate according to claim 10, wherein the low refractive index resin layer is formed of an adhesive resin.

12. The polarizing plate according to claim 8, comprising: a first protective layer, a polarizer, an adhesive/bonding layer, and the optical film for improving contrast ratio sequentially stacked in this order.

13. The polarizing plate according to claim 8, comprising: a first protective layer, a polarizer, and the optical film for improving contrast ratio sequentially stacked in this order,
    wherein the polarizer directly adjoins the optical film for improving contrast ratio.

14. The polarizing plate according to claim 13, wherein low refractive index resin layer is formed of an adhesive resin.

15. A liquid crystal display comprising the optical film for improving contrast ratio according to claim 1.

16. A liquid crystal display comprising:
    a light guide plate;
    a prism sheet;
    a first polarizing plate;
    a liquid crystal panel; and
    a second polarizing plate,
    wherein the prism sheet comprises one or more prisms formed on one surface thereof facing the light guide plate, and
    the second polarizing plate comprises the optical film for improving contrast ratio according to claim 1.

17. The liquid crystal display according to claim 16, wherein each of the prisms comprises two prism planes, and at least one of the prism planes has an inclined angle θ1 of about 53° to about 60° with respect to a direction perpendicular to a light exit plane of the prism sheet.

18. The liquid crystal display according to claim 16, wherein each of the prisms has a vertex angle θ2 of about 63° to about 70°.

19. The liquid crystal display according to claim 16, wherein the light guide plate allows light to exit therefrom at a light exit angle of about 50° to about 90°.

* * * * *

UNITED STATES PATENT AND TRADEMARK OFFICE
CERTIFICATE OF CORRECTION

| | | |
|---|---|---|
| PATENT NO. | : 10,408,989 B2 | |
| APPLICATION NO. | : 15/559808 | |
| DATED | : September 10, 2019 | |
| INVENTOR(S) | : Lee et al. | |

It is certified that error appears in the above-identified patent and that said Letters Patent is hereby corrected as shown below:

In the Claims

Column 28, Line 51, Claim 18    delete "82" and insert -- $\theta 2$ --

Signed and Sealed this
Twenty-fifth Day of August, 2020

Andrei Iancu
*Director of the United States Patent and Trademark Office*